United States Patent

Dorosz

[11] Patent Number: 5,586,611
[45] Date of Patent: Dec. 24, 1996

[54] DRILL BIT HAVING DUAL SPLIT BUSHINGS FOR CUTTER SUPPORT AND RETENTION

[75] Inventor: Daniel E. D. Dorosz, Joplin, Mo.

[73] Assignee: Cypress Services, Inc., Spring, Tex.

[21] Appl. No.: 542,678

[22] Filed: Oct. 13, 1995

[51] Int. Cl.⁶ .................................................. E21B 10/22
[52] U.S. Cl. ........................... 175/369; 175/40; 175/371; 384/95
[58] Field of Search ................................... 175/369, 371, 175/372, 40, 228; 384/95, 96

[56] References Cited

U.S. PATENT DOCUMENTS

| Re. 28,625 | 11/1975 | Cunningham . | |
|---|---|---|---|
| 1,636,663 | 7/1927 | Reed . | |
| 1,692,793 | 11/1928 | Reed . | |
| 2,595,903 | 5/1952 | Swart | 384/95 |
| 2,595,904 | 5/1952 | Swart | 384/95 |
| 3,866,987 | 2/1975 | Garner | 175/371 X |
| 3,995,917 | 12/1976 | Quinlan | 384/95 |
| 4,145,094 | 3/1979 | Vezirian | 175/375 X |
| 4,157,122 | 6/1979 | Morris | 175/369 |
| 4,181,377 | 1/1980 | Oelke . | |
| 4,249,781 | 2/1981 | Olschewski et al. | 175/372 X |
| 4,260,203 | 4/1981 | Garner . | |
| 4,478,299 | 10/1984 | Dorosz | 175/369 |
| 4,572,306 | 2/1986 | Dorosz | 175/371 |
| 4,756,631 | 7/1988 | Jones | 384/95 |
| 4,802,539 | 2/1989 | Hall et al. | 175/371 X |
| 4,874,047 | 10/1989 | Hixon | 175/369 |
| 4,875,532 | 11/1989 | Langford, Jr. | 175/371 |
| 5,040,624 | 8/1991 | Schumacher et al. | 175/371 |
| 5,080,183 | 1/1992 | Schumacher et al. | 175/371 |
| 5,402,858 | 4/1995 | Quantz et al. | 175/371 |

FOREIGN PATENT DOCUMENTS

| 233571 | 5/1969 | U.S.S.R. | 175/371 |

*Primary Examiner*—Hoang C. Dang
*Attorney, Agent, or Firm*—Bush, Moseley, Riddle & Jackson

[57] ABSTRACT

A rotary cutter cone type drill bit having a body structure with a plurality of depending cutter support lugs each having a spindle integral therewith and defining a cylindrical bushing support surface and a spindle head. A cutter cone is positioned for rotation about each of the spindles and is supported for rotation and axial retention by a dual split bushing arrangement. The dual split bushing arrangement has an inner split bushing received in immovable relation about the cylindrical bushing support surface of the spindle and outer split bushing being received in rotatable bearing relation about a portion of the inner split bushing and functioning to retain the inner split bushing about the cylindrical bushing support surface. The inner split bushing also retains the outer split bushing so that the cutter cone is maintained in assembly with the spindle. The outer split bushing is secured in immovable relation within the cutter cone by a lock element or by threaded connection. The split bushings are machined, hardened and are then split by a guillotine type splitter.

13 Claims, 7 Drawing Sheets

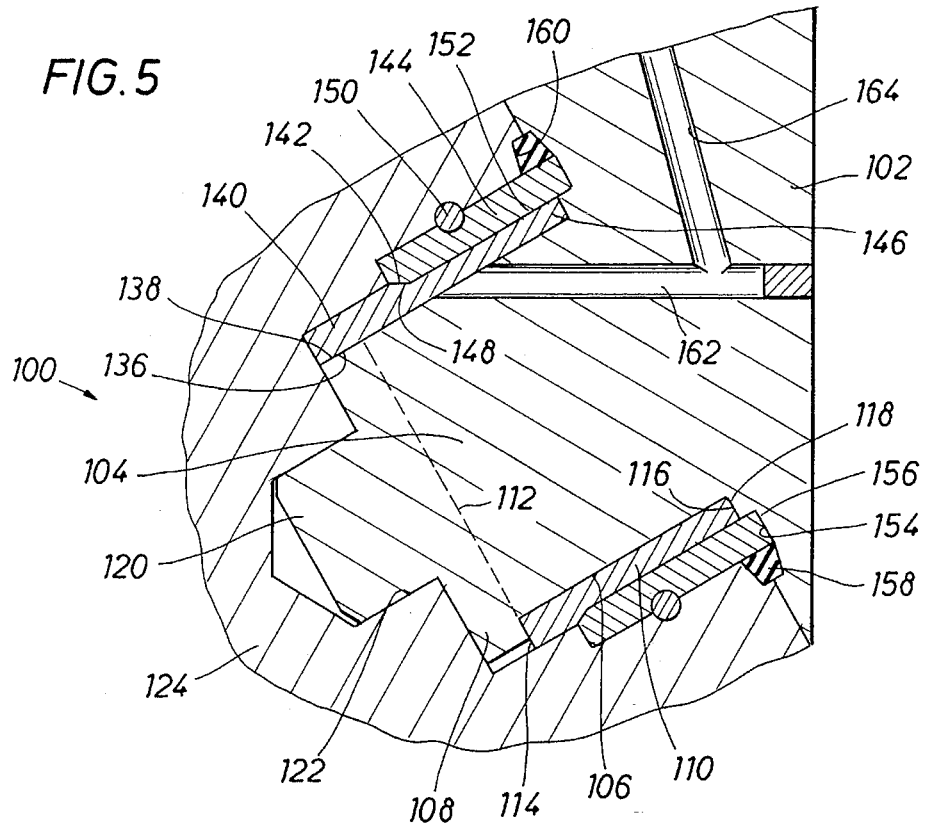
FIG. 5
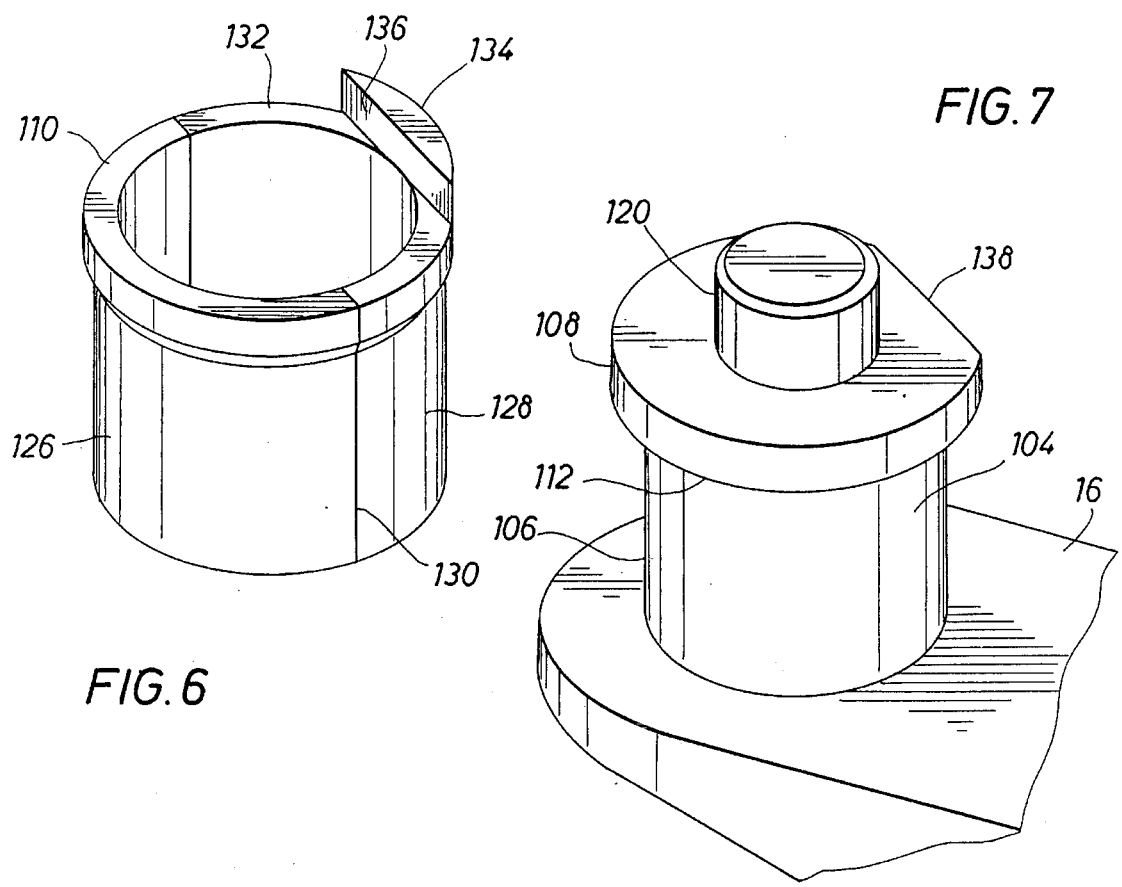
FIG. 6
FIG. 7

DRILL BIT HAVING DUAL SPLIT BUSHINGS FOR CUTTER SUPPORT AND RETENTION

FIELD OF THE INVENTION

This invention relates generally to earth boring apparatus and more particularly to earth boring drills having rotary cutters for the purpose of accomplishing drilling operations in relatively hard, consolidated earth formations. Even more specifically, the present invention concerns rotary cutter cones for rock bits having dual, radially arranged bushings for rotary cutter retention and wear resistance, which bushing assembly may also be lubricated for wear resistance. The present invention also concerns the manufacture of split bushings and assembly thereof to rock bit spindles for wear resistant support of the rotary cutter cones thereof. The present invention is further directed to the manufacture of split bushings that are used for rotary support and stabilization of the rotary cones of rock bits.

BACKGROUND OF THE INVENTION

In the drilling of deep wells in earth formations many different types of earth formations are encountered. Boring or drilling operations in each of these types of formations typically requires drill bits of differing character. For example, in loose or unconsolidated earth formations such as gravel strata, soft sandstone, it is desirable to utilize drill bits having a plurality of fixed blades for cutting away the formation to define a borehole. Where consolidated, very hard earth strata is encountered, for example in deep earth formations, it is typically desirable to employ drill bits having a plurality of rotary cutters each having a multiplicity of cutter teeth thereon. Many drill bits of this nature are referred to as "tri-cone rock bits". Typically this type of rock bit incorporates a drill bit body having three and in some cases more depending legs or lugs each defining a spindle. Typically each of the spindles projects toward the rotary axis of the drill bit body. Each of the spindles then supports a rotary cutter element or "cone" which is provided with a multiplicity of cutter teeth. The cutter teeth of individual cutter cones are cooperatively associated or arranged with the cutter teeth of other cutter cones of the drill bit so that the earth formation is cut away as the drill bit is rotated at the lower extremity of drill pipe that is rotated by a drilling rig.

One of the paramount disadvantages of rotary cone type drill bits having cone type rotary cutters is the inability of the cutter bearings or bushings to withstand the severe wear characteristics to which the drill bit is typically subjected. As drilling operations occur, rock bits are subjected to severe impacting and vibration as well as other wear inducing factors that are highly detrimental to the service life of the bearings or bushings of the rotary cutter cones. When tri-cone rock bits are rotated for extended periods of time under high loading, even though provided with bearings or bushings for cutter cone support the bearing surfaces of the spindles can quickly become worn to an essentially elliptical configuration, permitting the cutter cones to wobble or tilt due to the excessive clearance that occurs as the result of wear. Further, rotation of the cutter cones in the presence of drilling fluid which is of extremely abrasive nature will cause rapid bearing seal deterioration permitting invasion of the abrasive drilling fluid into the bushing or bearings of the cutter cones. When this occurs, the bearings or the spindle of the drill bit will become rapidly worn to the point that the cutter cones can become separated from the spindles, whereupon they can fall into the drilled bore when the drill bit is lifted and thus interfere with drilling operations and will typically require that the drill bit be withdrawn from the hole and the cutter cones retrieved by fishing operations. This of course is expensive and time consuming and results in significant cost that becomes a detriment to the overall cost of the drilling operation. It is desirable therefore to provide a rotary cone type rock bit having a bearing or bushing assembly that provides for rock bent cutter retention and also serves to enhance the wear resistant characteristics of the drill bit assembly.

Typically the drill bodies of rotary cutter bits take the form of integral cast or forged structures that are very expensive to manufacture because of the complex configuration thereof. It is also desirable to provide a rotary drill bit construction having a body structure of exceptional strength and durability and yet being of relatively low cost because of the provision of efficient bushings or bearing assemblies that efficiently accommodate the severe wear characteristics to which the rotary cones are subjected and also insure against wear of either the spindles or the rotary cones of the drill bit construction so that loss of the cutter cones is significantly minimized as compared with conventional rotary cone type drill bits.

SUMMARY OF THE INVENTION

It is therefore a primary feature of the present invention to provide a novel rotary cone type drill bit construction having a drill bit body of relatively low cost construction and having lugs with spindles and further having dual, radially arranged split bearings or bushings that are composed of hard, wear resistant material that provide for efficient rotary cutter support.

It is another feature of the present invention to provide a novel dual split bushing mounting assembly for rotary cone rock bits that eliminates or minimizes the wear to which the spindle and cutter are ordinarily subjected and thus significantly extends the service life of the drill bit.

It is another feature of the present invention to provide a novel dual split bushing mounting assembly for rotary cone rock bits that functions to effectively stabilize the rotary cones of rock bits and prevent or minimize the cutter cone tilting or wobbling movement that often occurs as the rotary cutter cones are forced against the formation by the weight of the drill string.

It is an even further feature of the present invention to provide a novel dual split bushing mounting assembly for rotary cone rock bits wherein the split bushing assembly functions to provide for efficient rotary cone cutter retention to minimize the possibility of one or more of the rotary cone cutters becoming separated from the spindle of the drill bit lugs when the drill bit is lifted from the bottom of the drilled wellbore.

It is another important feature of the present invention to provide a novel dual split bushing mounting assembly for rotary cone rock bits wherein the split bushing assembly incorporates inner and outer wear resistant split bushings where the inner split bushing is disposed in immovable relation with the spindle and the outer split bushing is disposed in immovable relation within the rotary cutter cone and the inner and outer wear resistant bushings cooperatively define a rotary interface for the cutter assembly.

It is another feature of the present invention to provide a novel dual split bushing mounting assembly for rotary cone rock bits that incorporates inner and outer wear resistant split bushings wherein the outer split bushing functions additionally to retain the inner split bushing against radial separation.

It is an even further feature of the present invention to provide an effective method and apparatus for the manufacture of split bushings for rotary support of the cutter cones of tri-cone type rock bits.

Briefly, the various objects and features of the present invention are realized through the provision of a rotary cone type drill bit construction having a drill bit body defining a plurality of depending lugs each having a spindle having its axis of rotation oriented in intersecting relation with the axis of rotation of the drill bit body. Each of the spindles is provided with a rotary cutter cone having a plurality of cutter teeth projecting therefrom and interacting with the cutter teeth of adjacent cutter cones to provide for efficient cutting of bores through consolidated earth formations.

For support of each of the cutter cones a dual split bushing arrangement is provided. In one embodiment of the invention the dual split bushings are arranged radially with an inner split bushing being seated about a cylindrical bushing mounting surface of the spindle and being disposed in nonrotatable relation with the spindle. In this case the outer split bushing is retained against axial movement in the outboard direction relative to the spindle and lug and the inner split bushing functions additionally as a retainer to resist outboard movement of the outer split bushing and thus provides effectively for retention of the cutter cone in assembly with the spindle. The inner split bushing is designed to interfit about the spindle and to be secured to the spindle by bonding, shrink fit or by any other means that prevents movement of the inner split bushing relative to the spindle. The inner split bushing is retained against axial movement in one axial direction by a spindle head located at the outboard end of the spindle and is retained against movement in the opposite axial direction by a planar surface of the lug at the intersection of the inboard end of the spindle with a planar surface of the lug.

In another embodiment of this invention the dual split bushings are arranged inboard and outboard relative to the spindle. The spindle is provided with a cylindrical section extending from the lug to a spindle head that is located outboard of the cylindrical section. The spindle is also provided with an axial extension projecting further outboard from the spindle head. An inboard split bushing is disposed about a major portion of the spindle and establishes a rotary interface with the cylindrical spindle section. The inboard split bushing is fixed to the inner surface portion of the rotary cutter cone by a lock ring and, if desired, by threaded engagement. An outboard split bushing is received in nonrotatable relation about an outboard section of the spindle with a portion thereof surrounding the spindle head and filling a circular annulus between the spindle head and an internal wall surface of the cutter cone. The outboard split bushing defines an internal flat surface which engages a corresponding external flat surface of the spindle, in the same manner as described above in connection with FIGS. 6 and 7 to ensure that the bushing is maintained in nonrotatable relation with the spindle. While the inboard split bushing provides for bearing rotation of the cutter cone about the spindle, the outboard split bushing, about which the cutter cone rotates and with which the cutter cone has rotatable bearing engagement, provides bearing support to prevent or minimize the tilting or wobbling that is often experienced as the cutter cones of conventional rock bits are forced against the earth formation being drilled by the controlled weight of the rotating drill stem or other drilling equipment.

Either of the embodiments described above may be provided with or without a lubrication and seal system. For lubrication of the dual split bushings and spindle and for assisting the seal of the rotary cutter cone in preventing ingress of drilling fluid to the spindle and bushing assembly the lugs or legs of the body structure are provided with lubricant reservoirs for containing a suitable quantity of lubricant or grease. Each of the lubricant reservoirs is provided with a spring driven piston for pressurizing or energizing the lubricant of the lubricant reservoir to provide a continuous supply of lubricant for delivery to the bushing and spindle assembly of the respective rotary cutter cone assembly. The lugs and spindles are provided with grease courses extending from the grease reservoir to the respective spindle and bushing assembly so that the energized lubricant is continuously fed by spring and piston induced pressure to the bushings and spindle to minimize wear as the drill bit is operated. The lubricant reservoirs may each be provided with sensor means for sensing a condition of low lubricant, thus providing drilling personnel with a predetermined period of time, such as four hours for example, within which to schedule removal of the drill bit from the wellbore for relubrication and other maintenance that may be desired. One or more sensing probes may be located in the lubricant reservoirs in such manner as to detect a low lubricant condition and provide an alert or alarm signal. The signal can be in the form of an acoustic signal which is propagated through the drill stem or drilling fluid column to signal detection and display equipment incorporated within the drilling console of the drilling rig.

The present invention also contemplates the manufacture of split bushings for use in rotary cone type drill bits. The bushing is machined to the proper dimension, including external threading if the bushing is to be threaded into the receptacle of the rotary cone cutter. The bushing, in the machining process, is formed to define generally "V" shaped notches or grooves at opposite sides of one of the ends thereof. After machining the bushing is heat treated and is then split by a guillotine type splitter having a wedge that is driven into the "V" shaped notches with sufficient force to cause splitting of the bushing along the length thereof to define generally semi-cylindrical bushing halves.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings.

In the drawings:

FIG. 5 is a partial sectional view of a rotary cutter assembly of a rock bit having a dual split bushing assembly representing a slight variation from the dual split bushing assembly of FIG. 3;

FIG. 6 is an isometric illustration of an inner split bushing for the dual split bushing assembly of FIG. 5;

FIG. 7 is an isometric illustration of a drill bit body lug and spindle which is adapted to receive the inner split bushing of FIG. 6;

DETAILED DESCRIPTION OF PREFERRED EMBODIMENT

Figure 1:
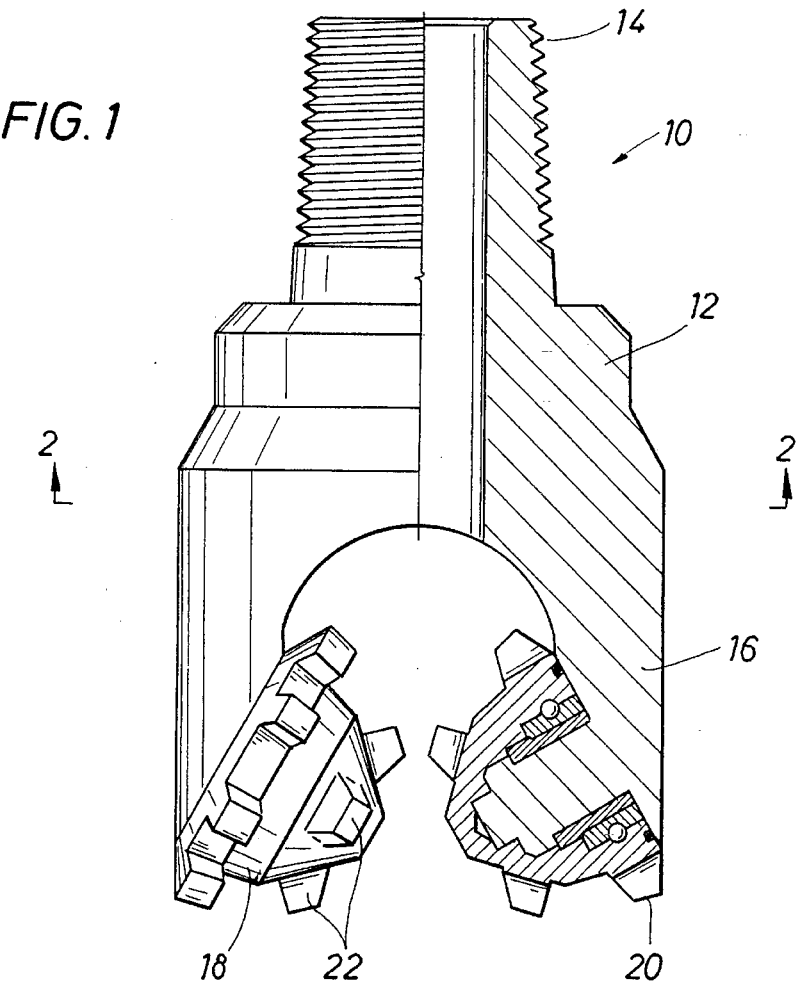
FIG. 1 is a partial sectional view in elevation illustrating a rotary cone drill bit that employs a dual bushing rotary cone support system that is constructed in accordance with the present invention and represents the preferred embodiment of the invention.
Figure 2:
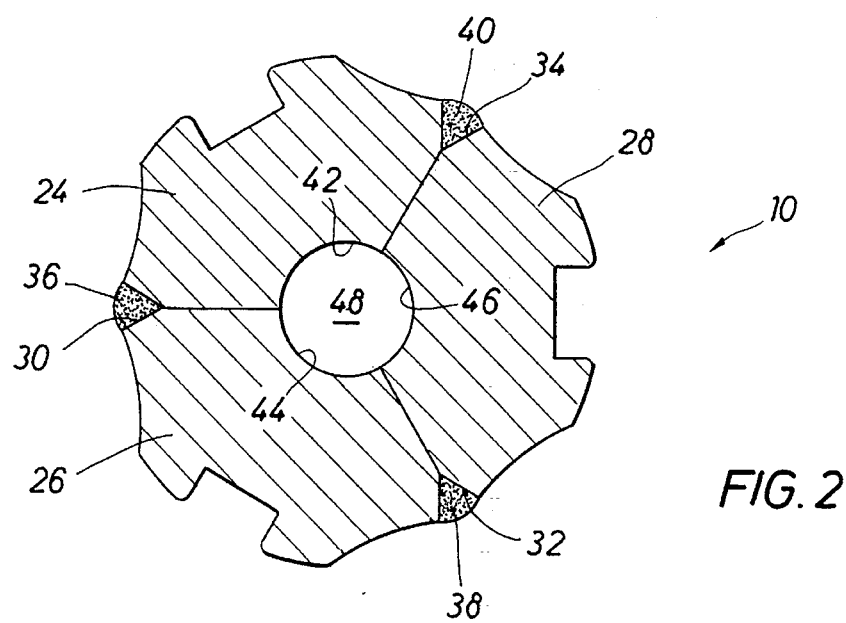
FIG. 2 is a sectional view taken along line 2—2 of FIG. 1.

Referring now to the drawings and first to FIGS. 1 and 2, a rotary cutter-type drill bit shown generally at 10 in quarter section is of the type typically referred to as a "rock bit" or "tri-cone type rock bit". The rotary bit structure 10 generally comprises a body structure 12 having a threaded upper extremity 14 for attachment of the drill bit to the lower section of a string of drill pipe, not shown. The body structure 12 also includes a plurality of depending cutter support lugs or legs 16, each supporting a rotary cutter element such as shown at 18 and 20. Each of the cutter elements is provided with a plurality of teeth 22 formed thereon, with the teeth of each cutter being cooperatively associated with the teeth of adjacent cutters to provide for optimum engagement between the teeth of each of the cutter elements and the formation being drilled. Each of the cutter elements of the drill bit structure will be of slightly different configuration, whereby the teeth of each cutter will cooperate with the teeth of a trailing cutter to provide for efficient cutter engagement with the formation as the rock bit is rotated relative thereto by the drill stem.

It is considered desirable to provide a drill body structure that is of low cost nature without any sacrifice from the standpoint of strength and durability. This feature may be conveniently accomplished in the manner illustrated particularly in FIG. 2. A plurality of drill bit body segments are provided as shown at 24, 26 and 28 and are of substantially identical configuration. The body segments may be formed by forging, casting or by any other suitable metal forming process. Since the casting or forging design of each of the body segments is of simple configuration, the casting or forging costs will be quite low and yet the body structure that has developed will be of substantial strength and durability when the body sections are assembled. As shown, each of the body sections comprises one-third of the body structure of the drill bit. The outer portions of the body segments are configured such that cooperative assembly of the body segments defines a plurality of welding grooves 30, 32 and 34 within which weld metal 36, 38 and 40 is deposited to secure the body segments in integral welded assembly. Each of the body segments also defines a partially cylindrical internal surface such as shown at 42, 44 and 46 which cooperate to define a generally cylindrical passage 48 when the body segments are in welded assembly. The passage 48 functions as a flow passage for drilling fluid to provide the rotary cutter elements with cooling and flushing of drill cuttings in order to provide for efficient drilling operations. As shown, each of the body segments is formed to define segment abutment surfaces that are oriented at an angular relationship of about 120 degrees. When the body segments are assembled, the abutment surfaces will be in engagement, thus orienting the rotary cutter elements of each of the body sections in proper relationship for optimum cutting capability.

Figure 3:
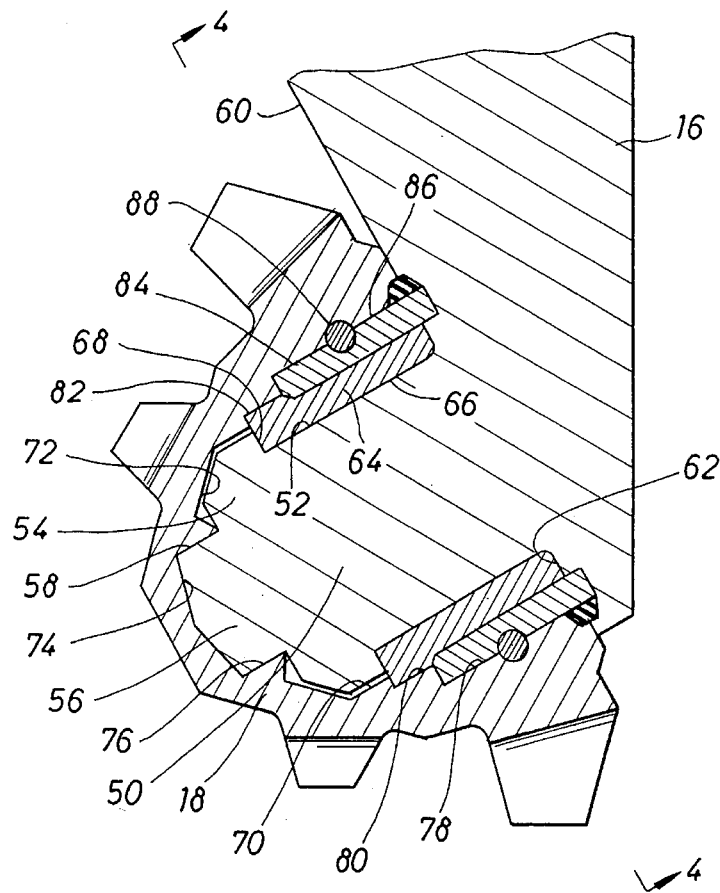
FIG. 3 is a partial sectional view of the drill bit construction of FIG. 1 showing 1 of the depending lugs thereof with its spindle and further showing a rotary cone being supported by the dual bushing assembly of the present invention.
Figure 4:
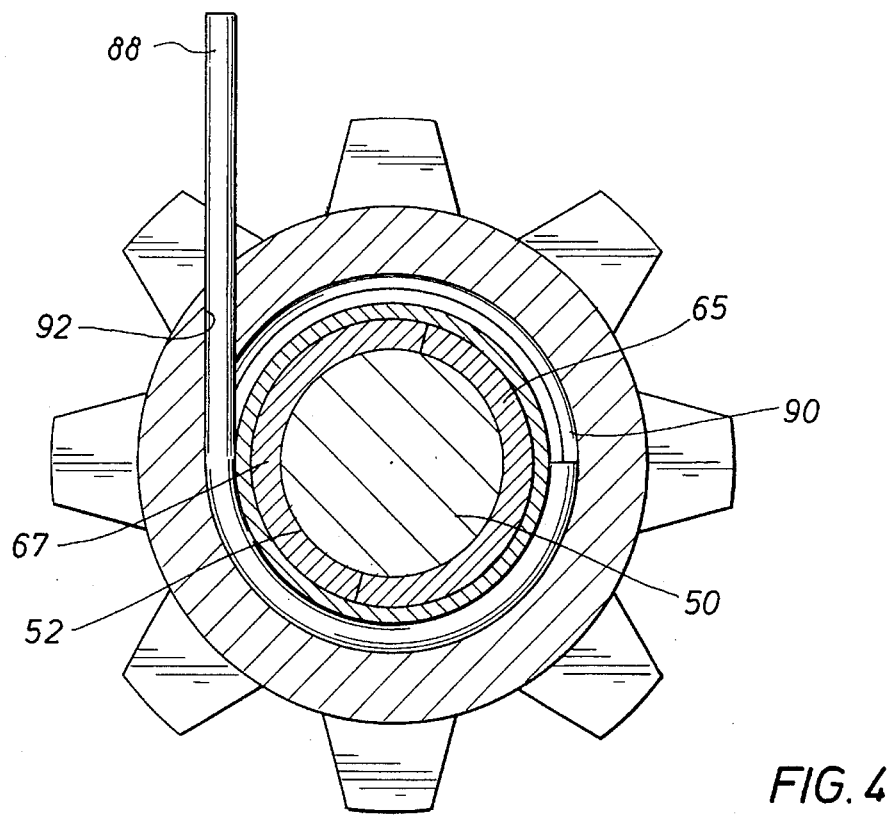
FIG. 4 is a sectional view taken along line 4—4 of FIG. 3.

Referring now to FIG. 3 the fragmentary sectional view illustrates the lower portion of one of the depending lugs or legs 16 of the rock bit 10 of FIG. 1, illustrating the lower structure thereof in detail. The depending lug 16 defines a transversely extending integral cutter support spindle 50 having a reduced diameter cylindrical surface 52 and near the axially outer extend thereof defining a bushing retainer head 54. The outer extent of the spindle also defines a central, cylindrical projection 56 defining a cylindrical external surface 58 for stabilization of the rotary cutter or cone 18 especially as the cutter cone is rotated under conditions of high load. The lug member 16 defines a generally planar surface 60 which is oriented in substantially normal relation with the axis of rotation of the spindle member 50. The planar surface 60, adjacent the spindle, defines a circular shoulder 62 that restrains axial movement of a split bushing member 64 which is seated with its inner cylindrical surface 66 disposed in non-rotatable relation with the cylindrical surface 52 of the spindle. The split bushing 64 which defines bushing halves 65 and 67 as shown in FIG. 4 may have its inner periphery bonded to the cylindrical surface 52 of the spindle to restrain the split bushing against rotation as the rotary cutter of the drill bit rotates. Alternatively, the split bushing 64 may be placed in assembly with the cylindrical surface 52 of the spindle by a shrink fit or by any other suitable means for maintaining a non-rotational relationship between the inner split bushing and the spindle surface 52. At its outer end the split bushing 64 is retained by a circular stop shoulder 68 that is defined by the circular spindle head 54 and is oriented so as to face the planar surface 60 of the lug 16. The axial length of the split bushing 64 is such as to establish engagement with the shoulder surface 62 and the circular shoulder 68 when the bushing is place in assembly with the spindle. This feature effectively prevents axial movement of the inner split bushing and further enhances the static relationship of the split bushing to the cylindrical surface of the spindle. The inner split bushing 64, which may also be referred to as a wear ring, may be composed of any one of a number of suitable hard and durable bearing materials including stellite, carbide, porcelain or any one of a number of other metallic, vitreous or polymer materials without departing from the spirit and scope of this invention. The inner split bushing or wear ring is provided to insure that the spindle 50 does not become worn or eroded until such time as the bushing members have failed to a considerable extent. This feature also enhances cutter cone retention because the inner split bushing or wear ring will function efficiently to provide for cutter retention even under conditions of excessive wear.

It is also desirable that the cutter cone 18 be protected against the characteristics against of accelerated wear that often occurs when rock bits are operated in the erosive environment of drilling fluid. To accomplish this feature the cutter cone 18 is formed internally to define a spindle and bushing receptacle 70 which defines an internal geometry 72 to receive the circular head 54 of the spindle and defines an internal geometry 74 to receive the axially projecting portion 56 of the spindle in such manner that an internal cylindrical surface 76 of the cutter element is disposed in stabilizing engagement with the cylindrical external cylindrical surface segment 58 of the spindle projection 56. The internal cavity or receptacle of the cone type cutter element 18 defines internal cylindrical bushing engagement surfaces 78 and 80. The enlarged outer extremity of the inner split bushing element 64 defines an external cylindrical surface 82 that is in rotatable relation with the inner cylindrical surface segment 80 of the spindle and bushing receptacle 70.

An outer bushing element 84, also being in the form of a split bushing, is provided with an external cylindrical surface 86 which is disposed in stationary relation with the inner cylindrical surface segment 78 of the receptacle 70. Since it is intended that the split bushing 84 remain static with respect to the cutter cone 18 a wire lock 88, snap ring type lock, ball lock or the like may be inserted into a lock receptacle 90 that is cooperatively defined by the internal surface geometry of the cutter cone receptacle and by the external surface portion of the outer bushing member 84. This wire lock or other locking element may be inserted into the locking receptacle 90 by means of an insert passage 92 as shown in FIG. 4 or by any other suitable means. Additionally, to further insure against relative rotation of the bushing 84 with respect to the cutter cone 18 the external cylindrical surface 86 of the outer bushing 84 may be bonded or otherwise attached to the cylindrical surface 78 of the cutter cone. Alternatively, by differential heat application, the outer surface 86 of the outer bushing may be seized with respect to the cylindrical surface 78 thus providing the bushing 84 with significant frictional retention so that it does not rotate relative to the internal surface of the cutter. Even further, the cylindrical surface 86 of the bushing member may be threaded and the outer bushing may be threadedly received in assembly with the cutter cone in the manner that is described hereinbelow in connection with other figures of the drawings.

Referring now to FIGS. 5 and 6 a further embodiment of the present invention is shown generally at 100 wherein a lug 102 of a drill bit body is formed to define a spindle 104 having a generally cylindrical bushing support surface 106 and a spindle head 108 of circular configuration and being of greater dimension as compared to the dimension of the cylindrical surface 106. An inner split bushing member 110 is positioned about the cylindrical surface 106 and is disposed in immovable relation therewith by means of bonding, friction fit, shrink fit or by any other suitable means. The inner split bushing 110 is supported against axial movement relative to the spindle 104 by a circular shoulder 112 which engages the outboard end 114 of the spindle as shown in FIG. 5. The inner split bushing is supported against axial movement in the opposite or inboard direction by a circular support shoulder 116 that is disposed for engagement with the opposite end 118 of the inner split bushing or wear ring. At its free extremity the spindle 104 defines a generally cylindrical axial projection 120 which is received in close fitting relation within a mating portion 122 of the spindle receptacle that is defined within the rotary cutter cone 124. The axial projection 120 functions to stabilize the rotary cutter cone to prevent it from tilting, wobbling or otherwise becoming misaligned during its rotary motion. The inner split bushing 110 is shown in greater detail in FIG. 6 and incorporates bushing halves 126 and 128 respectively. Bushing half 128, prior to being split along the split line 130, is machined to define a notch 132 which forms a bushing projection 134 having a flat surface 136 thereon. The split bushing arrangement of FIG. 6 is intended for mating assembly with the spindle 104 which is shown by the isometric illustration of FIG. 7. The flat surface 136 of the bushing half 128 shown in FIG. 6 is intended to establish aligning engagement with a corresponding flat surface 138 of the spindle head 108.

The split bushing 110 defines an enlarged end portion 140 having a tapered external surface 142. An outer split bushing 144 is positioned about a reduced diameter portion 146 of the inner bushing and defines a correspondingly tapered surface 148 which is disposed in abutting engagement with the tapered surface 142. Tapered surface 142 defines a tapered shoulder which functions as a retaining shoulder to insure against axial movement of the outer split bushing 144 relative to the inner split bushing. The outer split bushing is retained in immovable relation with respect to the cutter cone 124 by a retainer wire 150 such as that shown at 88 in FIG. 4. The outer bushing establishes a rotational interface with the inner split bushing at 152 and at the tapered shoulders 142 and 148. Since the inner split bushing is fixed with respect to the cylindrical surface 106 of the spindle it functions as a wear ring to prevent the wear that normally occurs as a rotary cone bushing is rotated directly on the spindle.

Figure 8:
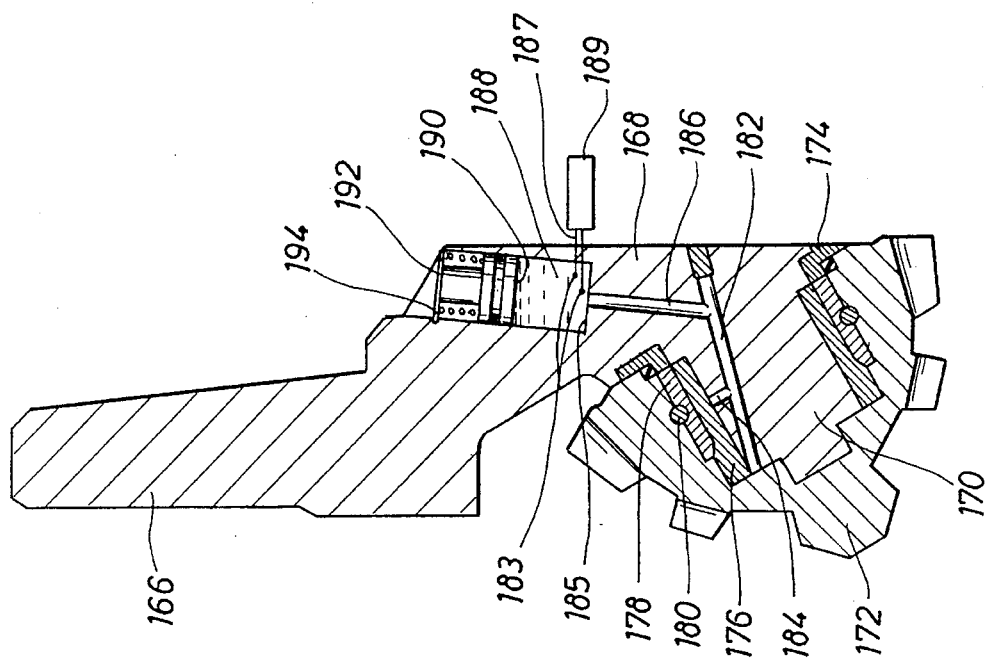
FIG. 8 is a sectional view of a portion of a lubricated rotary cone drill bit showing a single cutter cone assembly, having a dual split bushing assembly for rotary support of the cutter cone and further having a low lubricant sensing and signaling system being shown schematically.

The lug structure 102 of the drill bit body is formed to define a circular recess 154 which receives an end portion 156 of the outer split bushing as shown in FIG. 5 and also receives a circular sealing element 158 which surrounds the outer split bushing. The circular seal member 158 is also partially received within a circular seal groove section 160 that is defined within the rotary cutter cone 124. The outer split bushing and circular seal member function to minimize the potential for lubricant blow-by as the drill bit is rotated against the earth formation in the presence of a drilling fluid medium. If desired, the lug structure 102 of the drill bit may be machined such as by drilling to define grease courses 162 and 164 through which grease is delivered as a suitable lubricant for lubrication of the split bushing assembly. The grease course 164 will function as a lubricant supply to receive lubricant from an energized lubricant supply such as is shown in FIG. 8. The outer end of the drilled grease course 162 may be closed by a closure plug or in the alternative, may be closed by welding.

Referring now to FIG. 8 a drill bit body segment is shown at 166 having a lug or leg 168 defining an integral spindle 170 for support of a rotary cutter cone 172. The lug or leg structure 168 may be provided with a shirttail wear ring 174 which may be composed of hardened material such as stellite or may be composed of any other suitable wear resistant material. This shirttail wear ring is discussed in greater detail in connection with FIG. 10 hereof. For rotary support of the cutter cone 172 and inner split bushing 176 is positioned about the spindle 170 and is basically of the configuration that is shown in FIG. 3 and FIG. 5. An outer split bushing, also of the configuration shown in FIGS. 3 and 5 is shown at 178 and is retained by a wire lock 180 or by any other suitable retainer means. The lug member 168 is drilled or otherwise formed to define grease courses 182, 184 and 186. Grease course 186 is a supply course being in supplied communication with a grease reservoir 188 being filled with a lubricant member. The grease or lubricant is energized by a piston member 190 being driven by a spring 192 which is secured by a spring retainer ring 194. The compression spring 192 maintains a positive force on the piston 190 thus causing the grease within the chamber 188 to be pressurized for continuous feeding thereof to the grease courses for distribution to the dual split bushing assembly and to the interface between the spindle and the rotary cutter cone.

The lubrication system of the drill bit is provided with means for sensing the presence of sufficient lubricant, "grease" to ensure that the bushings do not run dry during drilling operations. In the event the volume of lubricant within the lubricant chamber should run low it is desirable that this low lubricant condition be displayed at the drilling console of the drilling rig so that appropriate action may be taken. The lubricant reservoir is provided with one or two grease sensors or probes 183 which are located within the lubricant reservoir near the end wall 185 or which are located at any other desirable location within the lubricant supply system of the drill bit. The sensors or probes are preferably "moisture probes" which sense the presence of lubricant. The probes are connected via conductors 187 to an electronic alarm shown by a block diagram at 189 which will generate a signal in the event a low lubricant condition is detected. Though the block diagram 189 is shown externally of the drill bit for purposes of simplicity and understanding, it should be understood that it may be located within the body structure of the drill bit. The signal can be in the form of an acoustic signal which will propagate through the drill stem to signal detection means that is located at the surface. The detection means will then provide a display or emit an alarm providing drilling personnel with knowledge of the low lubricant condition, preferably the alarm would indicate a limited period of time, such as four hours for example, before the lubricant supply of the drill bit would be completely depleted. This will allow drilling personnel to schedule a time for pulling of the drill string out of the hole for drill bit lubrication and any other servicing that would be considered appropriate.

Figure 9:
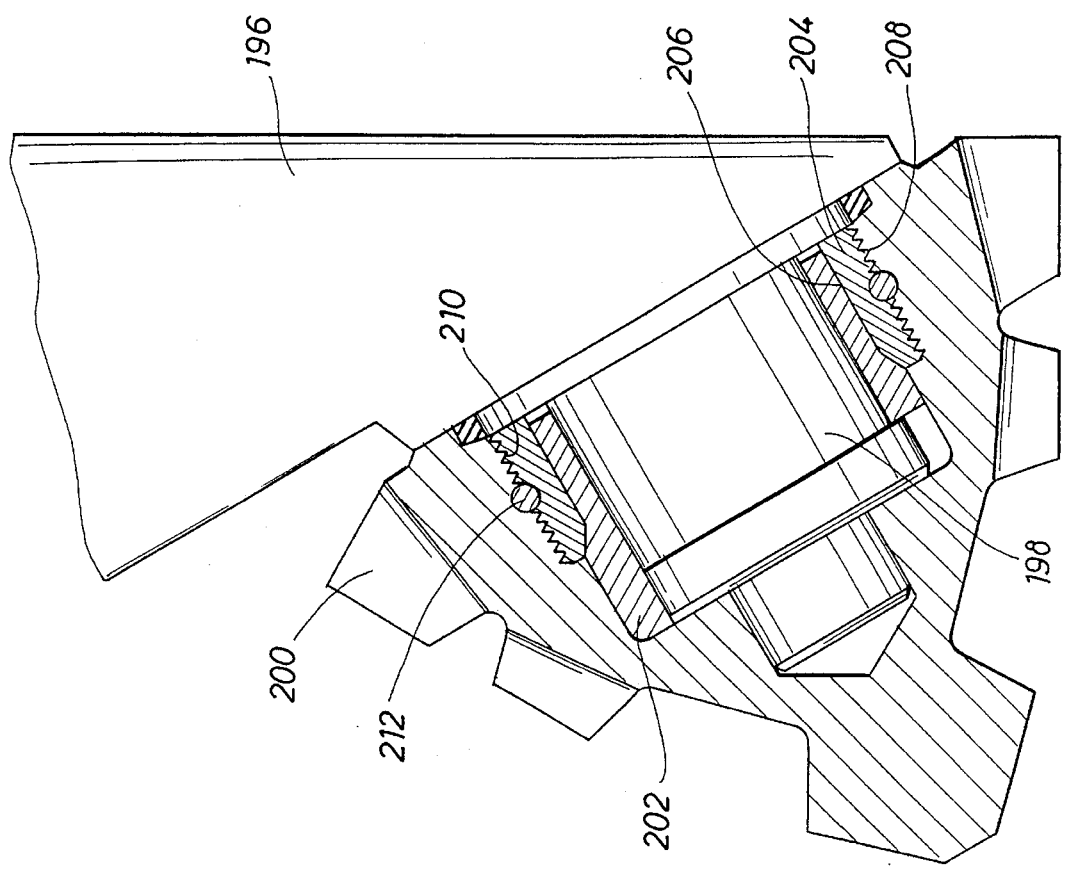
FIG. 9 is a sectional view of a rotary cutter cone assembly of a rock bit showing the cutter cone being mounted for rotation about a spindle by a dual split bushing assembly with the outer bushing thereof being threadedly received within the cutter cone.

Referring now to FIG. 9 there is shown a body lug structure 196 of a drill bit having an integral spindle 198 about which is supported a rotary cutter cone 200 by a dual split bushing arrangement. There is provided an inner split bushing or wear ring 202 of the general configuration shown in FIG. 5 which is disposed in fixed relation with the spindle 198. The inner bushing 202 is surrounded by an outer split bushing 204 which establishes a rotary interface 206 with the inner split bushing. The outer split bushing is fixed with respect to the cutter cone 200 by external threads 208 which are received by an internally threaded section 210 of the rotary cutter cone. So that the threads of the split bushing halves will be disposed in mating relation, the outer bushing 204 is threaded prior to being split to define the bushing halves. To enhance the retention of the outer split bushing in fixed relation with the cutter cone 200 a wire lock 212 or any other locking mechanism may be employed.

Figure 10:
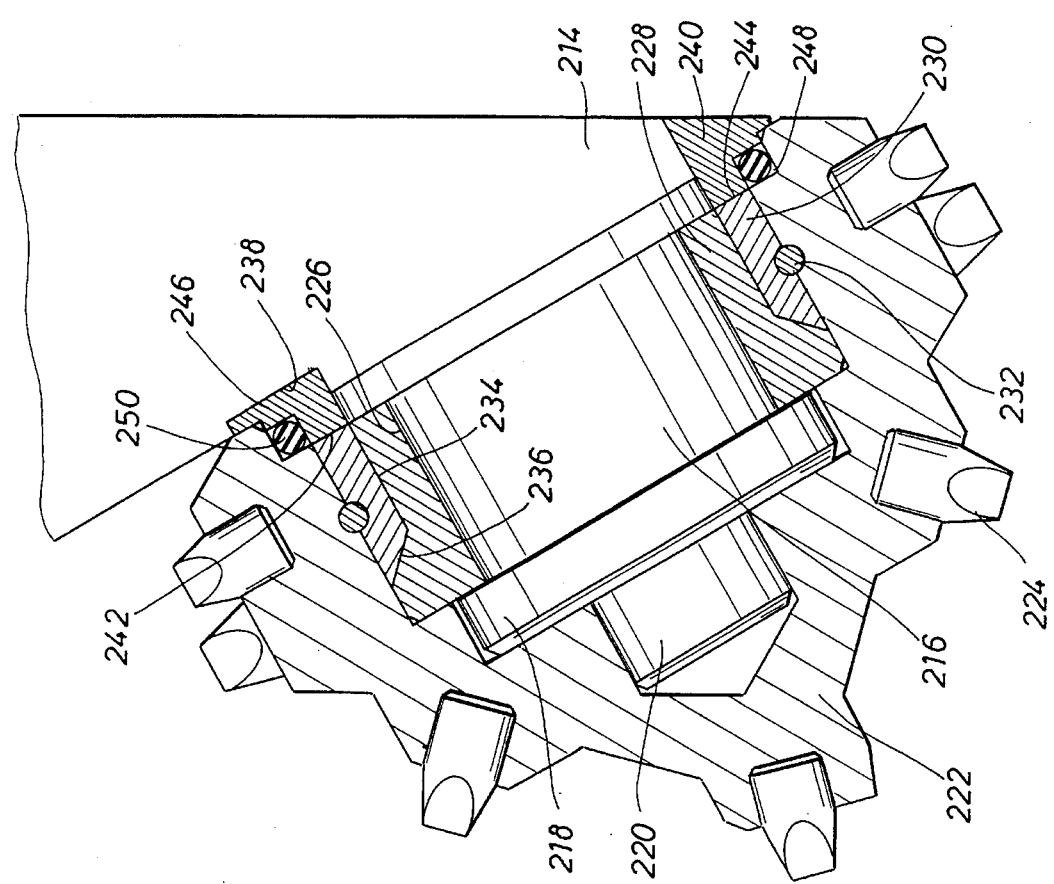
FIG. 10 is a partial sectional view of a rotary cutter cone cutter assembly of a rock bit having a dual split bushing assembly for rotary support of the cutter cone thereof and further having a shirttail wear member embedded within the lug for minimizing wear of the lug by the circular seal of the cutter cone.

A further embodiment of the present invention is shown in FIG. 10 wherein a drill bit lug is shown at 214 having an integral spindle 216 that is provided with a spindle head 218 and axial extension 220 as described above for stabilizing support of a rotary cutter cone member 222 having hardened cutter teeth 224. The spindle 216 is defines a cylindrical bushing support surface 226 which receives an inner split bushing member 228 in such manner that the inner split bushing is disposed in nonrotatable relation with the cylindrical surface 226 of the spindle. As mentioned above, the inner split bushing may be bonded to the surface 226 or in the alternative it may be retained by a friction fit, shrink fit or by any other suitable means so that it is held nonrotatable to the spindle. An outer split bushing is provided as shown at 230 which may be retained by a lock ring 232 for nonrotatable relation of the outer split bushing with respect to the rotary cutter cone. If desired, the outer periphery of the outer split bushing 230 may be threaded and received within a threaded portion of the spindle and bushing receptacle of the rotary cutter cone in the manner described above in connection with FIG. 9. The outer split bushing may alternatively be bonded with respect to the cutter cone or it may be secured in any other suitable manner for nonrotatable relation with the cutter cone. The inner and outer bushings establish a rotary interface at a cylindrical interface 234 and a tapered interface 236 in the manner described above in connection with FIG. 5.

The lug structure 214 may be machined to define a circular recess 238 which receives a circular, hardened shirttail wear ring 240 that is bonded to or otherwise retained in fixed assembly within the groove 238 of the lug structure. The wear ring 240 defines a circular wear surface 242 that is disposed for engagement by a circular end surface 244 of the outer split bushing 230. Additionally, the shirttail wear ring 240 defines a circular recess 246 that cooperates with a circular recess 248 of the cutter cone 222 to thereby define a circular seal chamber within which is received an O-ring type seal 250 or a seal of any other suitable configuration. The shirttail wear ring defines circular retainer surfaces that provide efficient sealing and support with respect to the O-ring or other suitable sealing member. Correspondingly, the rotary cutter cone element defines shoulder surfaces for support and sealing with respect to the circular sealing element 250.

Figure 11:
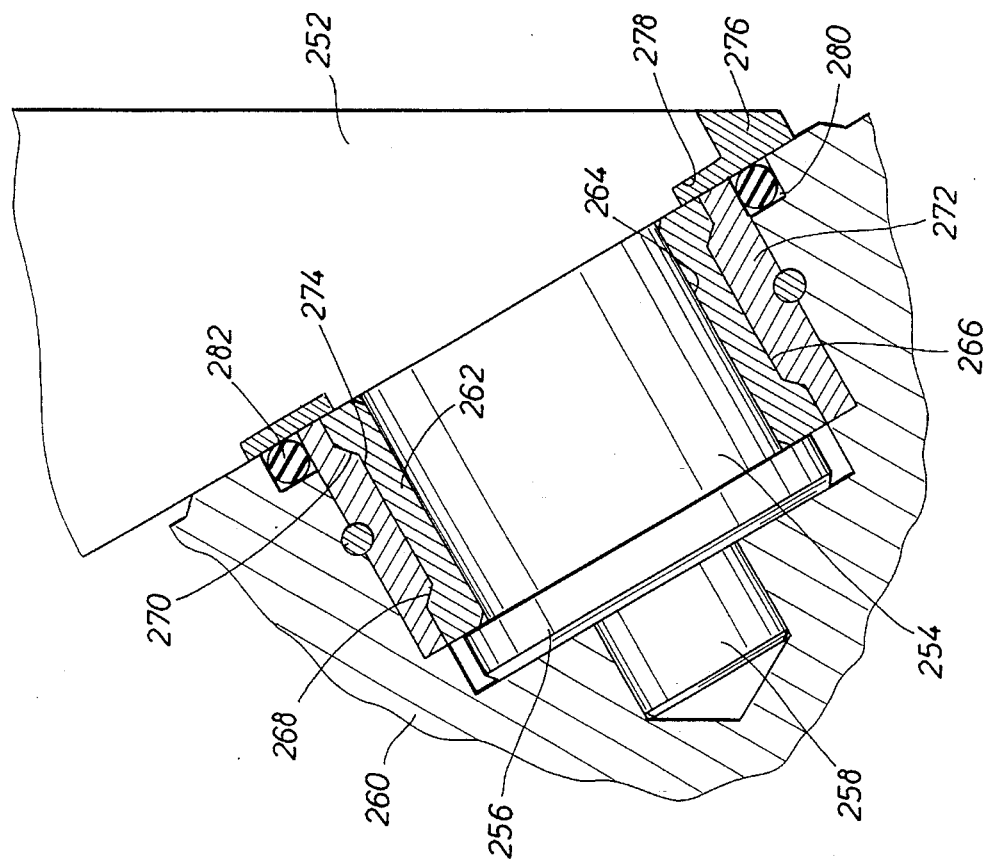
FIG. 11 is a partial sectional view of a dual split bushing assembly for the rotary cones of drill bits representing a further embodiment of the present invention wherein axially interlocked inboard and outboard split bushings are employed.

A further alternative embodiment of the present invention is shown in FIG. 11 which incorporates a body lug 252 having an integral spindle 254 provided with an enlarged spindle head 256 and an axial cone stabilizing extension 258 that is provided for stabilizing rotation of a cutter cone member 260. For support of the rotary cutter cone there is provided an inner split bushing 262 which is disposed in fixed relation with the outer cylindrical surface 264 of the spindle and defines an external cylindrical surface 266 and tapered external shoulder surfaces 268 and 270 which correspond with the internal geometry of an outer split bushing member 272 to define a rotary interface 274 between the inner and outer split bushings.

To provide the drill bit body with wear resistance the lugs 252 are each provided with a circular shirttail type wear ring 276 which is received within a circular wear ring seat 278 that is machined or otherwise formed in the lug member. The wear 276 cooperates with circular recess 280 of the rotary cutter cone to define a circular seal recess within which is received an O-ring type sealing member 282 or any other suitable type of sealing member to provide protection for the bushing assembly.

Figure 13:
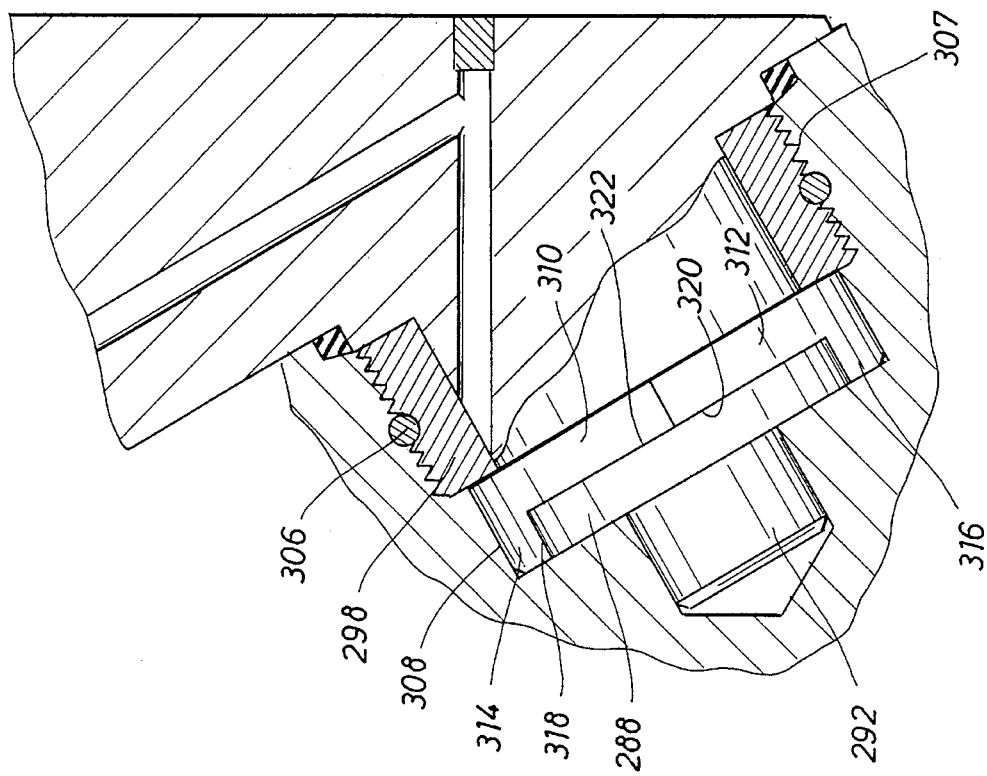
FIG. 13 is partial sectional view of the rotary cone cutter assembly of FIG. 12 showing further aspects of the inboard and outboard dual split bushing assembly of FIG. 12.
Figure 12:
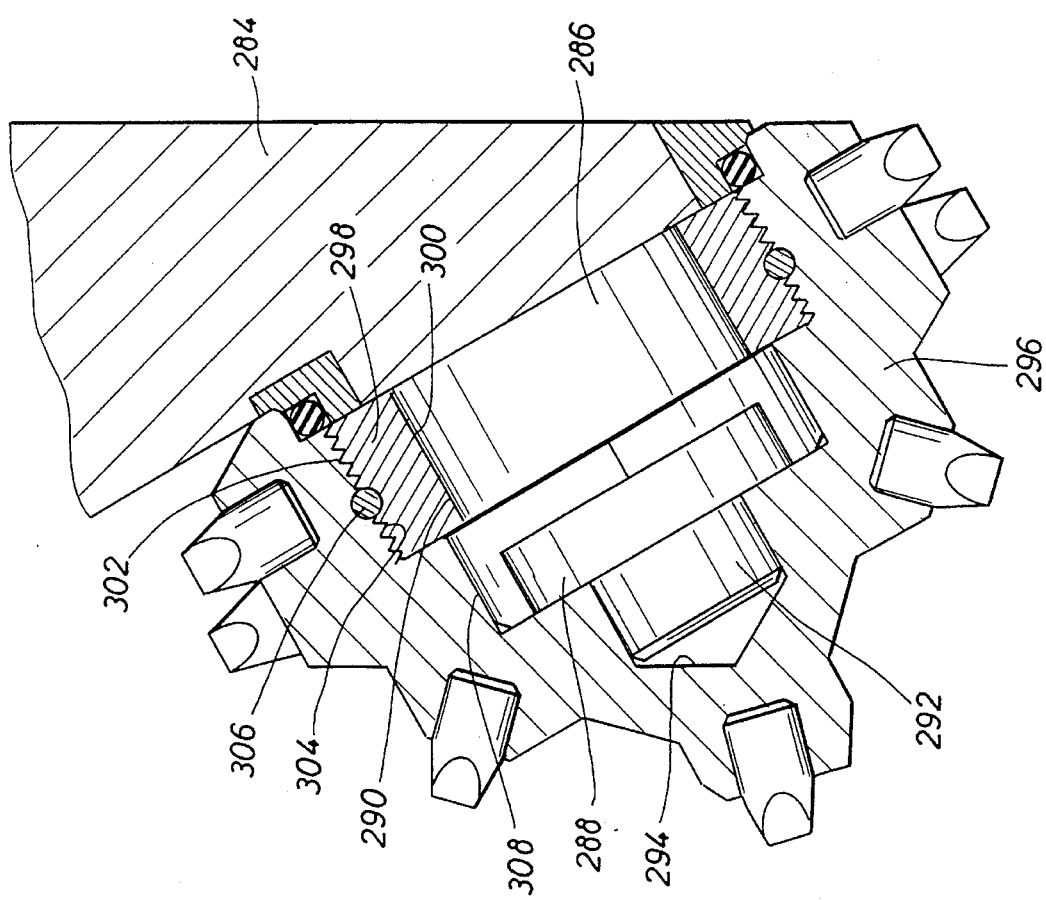
FIG. 12 is a partial sectional view of a rotary cutter cone assembly incorporating inboard and outboard dual split bushings for rotary support and stabilization of the cutter cone about a spindle and representing another embodiment of this invention.

Referring now to FIGS. 12 and 13 a further embodiment of the present invention is disclosed having dual split bushings, with the bushings being arranged in inboard and outboard relation for stabilizing support of the rotary cone member. As shown in FIG. 12 a body lug member 284 is provided with an integral spindle 286 having a spindle head 288 of smaller diameter as compared with the cylindrical outer surface 290 of the spindle. The spindle also defines an axial stabilizing extension 292 which functions within a corresponding receptacle 294 of a rotary cone member 296 to stabilize the cone against misalignment with respect to the spindle 286 as the cone is rotated by its cutting engagement with the formation being drilled. For rotary support of the cutter cone a generally cylindrical inner split bushing is provided at 298 and defines an inner cylindrical surface 300 which cooperates with cylindrical surface 290 to define a rotary interface between the spindle and inner bushing. The inner bushing is externally threaded at 302 for threaded engagement within an internally threaded section 304 of the spindle and bushing cavity of the rotary cutter cone member 296. To insure that the inner split bushing 298 does not become unthreaded from its engagement with the internal threads 304 a lock ring 306 or other suitable locking member may be employed to secure the inner bushing in fixed relation with the cutter cone in the manner described above. The inboard bushing may also be retained in fixed relation with the cutter cone by threaded engagement as shown in FIG. 13 at 307. An outboard split bushing is provided at 308 which, as shown in FIG. 13 defines bushing halves 310 and 312 each defining respective circular, axially projecting flanges 314 and 316 which are received immediately about the outer cylindrical surface 318 of the spindle head 288. The circular, outwardly projecting flanges of the outboard split bushing are receivable about the retainer head portion of the spindle and function to fill the circular space or annulus between the spindle head and the inner wall surface of the cutter cone. The circular section of the outboard split bushing is disposed about an intermediate portion of the spindle and defines an upwardly facing stop shoulder 320 that is positioned in retaining engagement with the circular retainer shoulder 322 of the retainer head of the spindle.

Figure 14:
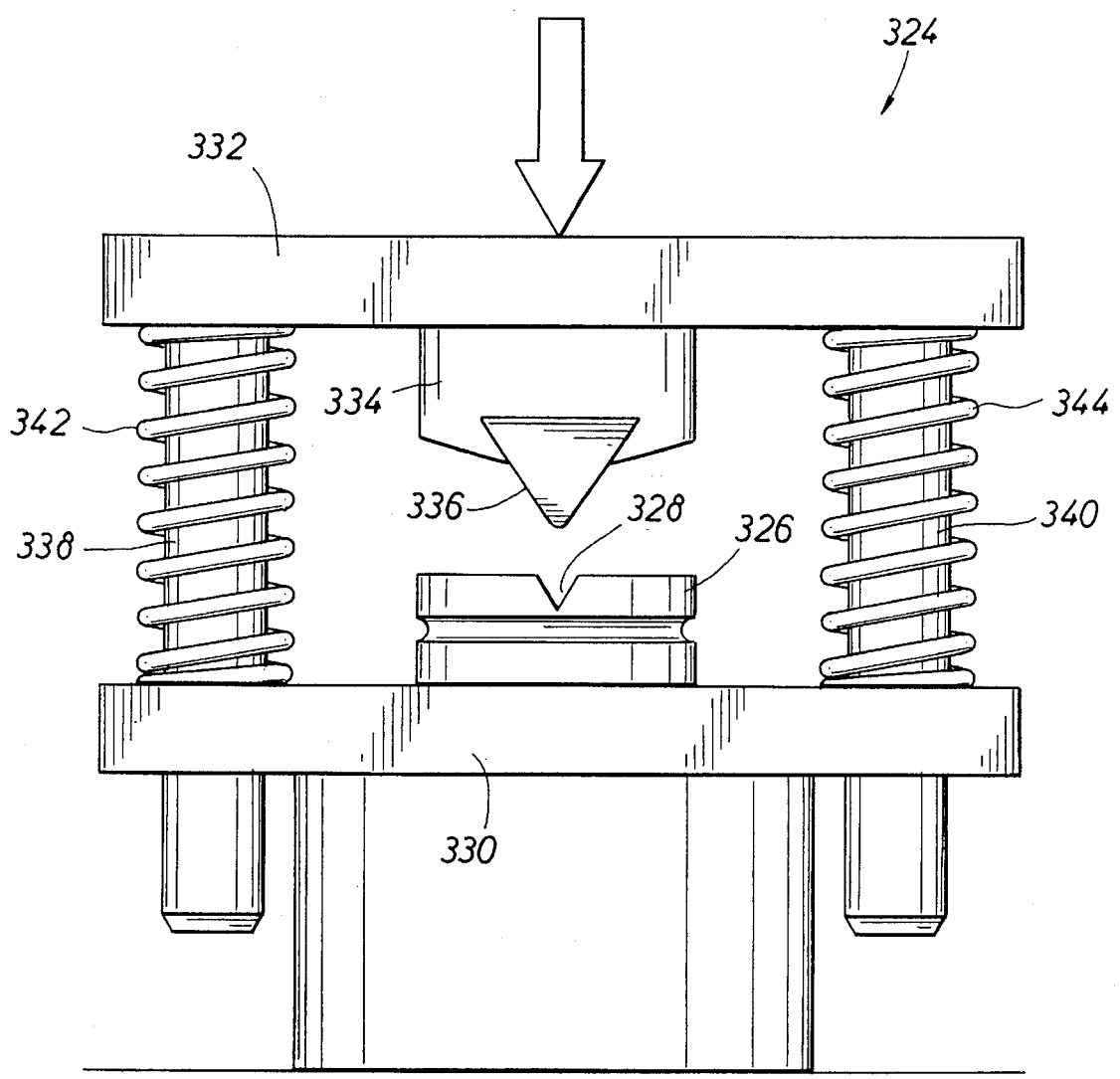
FIG. 14 is an elevational view of a guillotine type bushing splitter for splitting the bushings of FIGS. 1–13 and showing a bushing in position to be split by the splitting wedge thereof.

The present invention also contemplates the manufacture of split bushing for use in the rotary cone drill bit embodiments of FIGS. 1–13. As shown in FIG. 14 a guillotine type bushing splitter is shown generally at 324 for splitting a bushing shown at 326. In the manufacturing process for the bushing the bushing is machined to size, including the provision of external threading if desired. The bushing is specifically machined to define "V" shaped notches 328 on opposed sides of the bushing and at one of the axial ends thereof. Preferably the "V" shaped notches are in the range of about 60 degrees. The machined bushing is then subjected to a suitable heat treating process to develop the desired hardness in the material thereof. The material from which the bushing is composed can be stellite, carbide, ceramic or vitreous material or any other material that is suitable for the bushings of rotary cone type drill bits. After the heat treating process the bushing is placed on end as shown in FIG. 14 on a support plate 330 with the "V" shaped notches facing upwardly. The guillotine type splitter 324 is provided with a drive plate 332 having a splitter support 334 fixed thereto and supporting a guillotine splitter wedge element 336 having an angle greater than the angle of the "V" shaped notches and preferably being in the range of about 70 degrees. From the drive plate 332 depend a plurality of guide legs such as shown at 338 and 340 which extend through guide holes in the support plate 330. Retraction springs 342 and 344, being compression springs surround the guide legs, with the ends thereof in interposed engagement with both the drive plate and the support plate. In operation, a drive system, such as a hydraulic press, represented by the drive arrow 346, is applied to the drive plate to move the wedge 336 downwardly against the compression of the return or retraction springs and into the notches 328, with appropriate force of the wedge within the notches of the machined and hardened bushing the bushing will be split along its length on both sides thereby providing generally semi-cylindrical bushing halves. These bushing halves are used as so split, to define the split bushings shown in FIGS. 1–13.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A rotary cutter cone type drill bit, comprising:
   (a) a body structure having a plurality of depending cutter support lugs;
   (b) spindle means being integral with each of said cutter support lugs and defining a cylindrical bushing support surface;
   (c) a cutter cone being positioned for rotation about each of said spindle means;
   (c) an inner split bushing being received in immovable relation about said cylindrical bushing support surface; and
   (d) an outer split bushing being received in rotatable bearing relation about at least a portion of said inner split bushing and retaining said inner split bushing about said cylindrical bushing support surface, said outer split bushing being disposed in immovable relation with said cutter cone.

2. The rotary cutter cone type drill bit of claim 1, wherein:
   (a) said cylindrical bushing support surface having first and second ends; and
   (b) said spindle means defining a first shoulder at said first end of said cylindrical bushing support surface and defining a second bushing support shoulder at the second end of said cylindrical bushing support surface, said first and second bushing support shoulders being disposed in axially retaining engagement with respective ends of said inner split bushing.

3. The rotary cutter cone type drill bit of claim 1, wherein:
   (a) said inner split bushing defining an external circular retainer shoulder and an external cylindrical surface; and
   (b) said outer split bushing having a circular support shoulder being in retained engagement with said circular retainer shoulder of said inner split bushing and having an inner cylindrical surface being disposed in rotatable bearing engagement with said external cylindrical surface of said inner split bushing.

4. The rotary cutter cone type drill bit of claim 3, wherein:

said external circular retainer shoulder of said inner split bushing and said circular support shoulder of said outer split bushing being disposed in relatively rotatable relation.

5. The rotary cutter cone type drill bit of claim 3, wherein:

said external circular retainer shoulder of said inner split bushing and said circular support shoulder of said outer split bushing each being of tapered configuration and being disposed in mating relatively rotatable and axially supporting relation.

6. The rotary cutter cone type drill bit of claim 1, wherein:

said spindle means having a bushing retainer head of greater diameter as compared with the diameter of said cylindrical bushing support surface and defining a circular bushing retainer shoulder being disposed in axially retaining relation with said inner split bushing.

7. The rotary cutter cone type drill bit of claim 1, wherein:

(a) said cutter cone defining an internal spindle and bushing receptacle, a portion of said internal spindle and bushing receptacle being internally threaded; and (b) said outer split bushing being externally threaded and being threadedly receives by said internally threaded portion of said internal spindle and bushing receptacle.

8. The rotary cutter cone type drill bit of claim 7, wherein:

(a) said cutter cone and said outer split bushing cooperatively defining a circular locking receptacle having a lock entry passage extending from the outer portion of said cutter cone and intersecting said circular locking receptacle in substantially tangential manner; and (b) an elongate lock element being insertable through said lock entry passage into said circular locking receptacle and locking said outer split bushing against becoming unthreaded from said internally threaded portion of said internal spindle and bushing assembly.

9. The rotary cutter cone type drill bit of claim 1, wherein:

(a) said lug defining a generally planar surface being intersected by said spindle and defining a circular seal and bushing channel at the intersection of said spindle with said planar surface;

(b) one axial end of said outer split bushing being disposed within said circular seal and bushing channel; and (d) a circular sealing element being at least partially received within said circular seal and bushing channel and establishing a seal with said cutter cone.

10. The rotary cutter cone type drill bit of claim 9, wherein:

(a) said cutter cone defining a circular seal recess being located opposite said circular seal and bushing channel; and (b) said circular sealing element being disposed within said circular seal and bushing channel and said circular seal recess.

11. The rotary cutter cone type drill bit of claim 1, wherein:

(a) each of said lugs defining a generally circular recess located about its spindle;

(b) a wear member composed of a wear resistant material being located in each of said generally circular recesses and defining first circular seal engaging surface means;

(c) said cutter cone defining second circular seal engaging surface means being located opposite said first seal engaging surface means and cooperating therewith to define a circular seal chamber; and (d) a circular sealing element being located within said circular seal chamber and being in sealing engagement with said first and second circular seal engaging surface means.

12. The rotary cutter cone type drill bit of claim 1, wherein:

(a) said lug defining a lubricant reservoir for containing lubricant material and having lubricant course means for conducting lubricant from said lubricant reservoir to said split bushings and spindle;

(b) a piston being movable within said lubricant reservoir for forcing lubricant from said lubricant reservoir and through said lubricant course means; and (c) means urging said piston against said lubricant for substantially continuous lubrication of said split bushings and spindle.

13. The rotary cutter cone type drill bit of claim 12, wherein:

(a) said lubricant reservoir having at least one lubricant sensing probe therein; and (b) signal means being connected to said sensing probe and transmitting a signal to surface equipment upon sensing a predetermined minimum volume of lubricant within said lubricant reservoir.

* * * * *